US009179294B2

(12) United States Patent
Lodeweyckx

(10) Patent No.: US 9,179,294 B2
(45) Date of Patent: Nov. 3, 2015

(54) MOBILE COMMUNICATIONS

(75) Inventor: Stefan Lodeweyckx, Herent (BE)

(73) Assignees: SONY CORPORATION, Tokyo (JP); SONY EUROPE LIMITED, Weybridge (GB)

(*) Notice: Subject to any disclaimer, the term of this patent is extended or adjusted under 35 U.S.C. 154(b) by 133 days.

(21) Appl. No.: 13/540,043

(22) Filed: Jul. 2, 2012

(65) Prior Publication Data

US 2013/0012159 A1 Jan. 10, 2013

(30) Foreign Application Priority Data

Jul. 4, 2011 (GB) .................................. 1111355.2

(51) Int. Cl.

| | |
|---|---|
| ***H04M 11/00*** | (2006.01) |
| ***H04W 8/18*** | (2009.01) |
| *H04W 8/20* | (2009.01) |
| *H04W 8/26* | (2009.01) |

(Continued)

(52) U.S. Cl.

CPC ................ *H04W 8/183* (2013.01); *H04W 8/20* (2013.01); *H04W 8/265* (2013.01); *H04W 12/04* (2013.01); *H04W 88/18* (2013.01)

(58) Field of Classification Search

CPC ....... H04W 4/24; H04W 8/183; H04W 8/245; H04W 2215/32; H04W 88/02; H04W 8/12; H04B 1/3816; H04L 63/0823; H04L 63/08

USPC ............. 455/406, 432.1, 558, 418, 405, 408, 455/422.1, 433; 713/155, 168

IPC ....... H04W 4/24, 8/02, 8/26, 8/06; H04M 1/00; H04B 1/38; H04L 9/32

See application file for complete search history.

(56) References Cited

U.S. PATENT DOCUMENTS

| | | | | |
|---|---|---|---|---|
| 6,408,173 B1 * | 6/2002 | Bertrand et al. | .............. | 455/406 |
| 2002/0187775 A1 * | 12/2002 | Corrigan et al. | .............. | 455/414 |

(Continued)

FOREIGN PATENT DOCUMENTS

| | | |
|---|---|---|
| GB | 2464830 A | 5/2010 |
| GB | 2492750 A | 1/2013 |

OTHER PUBLICATIONS

Extended European Search Report Issued Oct. 22, 2012 in Patent Application No. 12174553.3.

(Continued)

*Primary Examiner* — Charles Appiah
*Assistant Examiner* — Alexander Yi
(74) *Attorney, Agent, or Firm* — Oblon, McClelland, Maier & Neustadt, L.L.P.

(57) ABSTRACT

A mobile data communications system that includes a mobile device having a reconfigurable user identification module that stores a mobile identity and provides mobile data communication via a mobile network, subject to the mobile identity being registered with the mobile network, and an account control server that includes memory to store identification and payment details for a user of the mobile device and a mobile identity provider to provide a mobile identity to the mobile device and to an authorization server of a mobile network. In response to a request by a user of the mobile device to obtain data access by a particular mobile network, the account control server provides a mobile identity to the mobile device for storage by the user identification module, provides the same mobile identity to the authorization server of that mobile network, and provides user identification and payment details to that mobile network.

12 Claims, 9 Drawing Sheets

(51) Int. Cl.
*H04W 12/04* (2009.01)
*H04W 88/18* (2009.01)

(56) References Cited

U.S. PATENT DOCUMENTS

| | | | | |
|---|---|---|---|---|
| 2008/0096559 | A1 | 4/2008 | Phillips et al. | |
| 2008/0311956 | A1 | 12/2008 | Taaghol | |
| 2009/0077643 | A1 | 3/2009 | Schmidt et al. | |
| 2009/0215447 | A1 * | 8/2009 | Catalano et al. | 455/432.1 |
| 2011/0035584 | A1 | 2/2011 | Meyerstein et al. | |
| 2012/0108206 | A1 * | 5/2012 | Haggerty | 455/411 |
| 2012/0282924 | A1 * | 11/2012 | Tagg et al. | 455/432.1 |

OTHER PUBLICATIONS

"3rd Generation Partnership Project; Technical Specification Group Services and System Aspects; Feasibility study on the security aspects of remote provisioning and change of subscription for Machine to Machine (M2M) equipment (Release 9)" 3rd Generation Partnership Project, 3GPP TR 33.812 V9.2.0, XP050441986, Jun. 2010, pp. 1-87.

U.S. Appl. No. 13/176,235, filed Jul. 5, 2011, Lodeweyckx.

U.S. Appl. No. 13/524,596, filed Jun. 15, 2012, Stefan Lodeweyckx.

United Kingdom Search Report issued Oct. 28, 2011 in corresponding Great Britain Application No. 1111355.2 filed on Jul. 4, 2011.

"3rd Generation Partnership Project; Technical Specification Group Services and System Aspects; 3G Security; Security Principles and Objectives (3G TS 33.120 version 3.0.0)", 3G TS 33.120, V3.0.0, Oct. 1999, 10 Pages.

"ETSI TC SCP #48", SCP(11)0146r1, Sophia Antipolis, France, Mar. 2-4, 2011, 2 Pages.

* cited by examiner

606

Name

Address

Bank account

Scan of ID

Browse

Upload

MOBILE COMMUNICATIONS

CROSS REFERENCE TO RELATED APPLICATION

The present application claims the benefit of the earlier filing date of GB1111355.2 filed in the United Kingdom Intellectual Property Office on 4 Jul. 2011, the entire content of which application is incorporated herein by reference.

BACKGROUND

1. Field of the Disclosure

This invention relates to mobile communications.

2. Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or implicitly admitted as prior art against the present invention.

Many mobile communications devices make use of so-called SIMs.

A SIM (subscriber identification module) is typically a secure data storage device embodied as a small form factor flat card which is insertable into a mobile communications device. The SIM carries certain data which uniquely identifies the user or owner of that SIM. Some of this data is transmitted across the mobile network to identify the user equipment (UE) into which the SIM is inserted, and some is kept secret within the SIM (and within a secure database held by the mobile network operator) for use in generating encryption keys for secure data transmission across the network.

In many countries there is a requirement that the SIM fits into a socket in the UE which is accessible by the user. This is to allow the user to choose a different card if he/she desires. In turn, this allows the user to select a different mobile network operator or a different network tariff. The ability for the user to do this is required by the competition law of many countries.

Having said this, some devices such as the Amazon® Kindle® electronic book reading device contain a SIM which is inaccessible to the user. This type of SIM will be referred to as an "embedded" SIM, though of course in the case of embedded SIMs, the word "card" often associated with "SIM" does not necessarily have any sensible meaning and does not imply any particular shape or form factor for the circuitry providing the SIM functionality. In other words, the user cannot choose a different network operator for mobile data access using this particular book reading device, but this is allowable because the device does not allow open internet access over the mobile network.

The European Telecommunications Standards Institute (ETSI) has recognised the future potential of including the functionality of a SIM (or, more generally, of a "UICC" or universal integrated circuit card) into a wide variety of devices. In general terms, this will provide communication functions to types of devices which have operated independently (that is, not using a mobile network) in the past. The way in which this would be carried out would be to embed the UICC in such a way that the UICC is not generally accessible or replaceable by the user.

ETSI has established a working group to look into the issues generated by the use of embedded UICC devices. This work is carried out by the ETSI TC Smart Card Platform group #48, and a document specifying a work item to address standardisation requirements has been accepted as SCP(11) 0146r1, which is available at: http://portal.etsi.org/portal/server.pt/community/scp/333 and is incorporated herein in its entirety by reference.

This ETSI document recognises the need for the user to be able to change network subscriptions on devices with embedded wireless wide area network (WWAN) connectivity, which in turn has prompted the proposal to develop new methods for securely and remotely provisioning access credentials on embedded UICC devices. The scope of work defined by the document covers "defining use cases and corresponding requirements for remote personalisation and subscription management of . . . an embedded UICC including its integration in telecommunication network infrastructures".

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

This invention provides a mobile data communications system comprising:

a mobile device having a reconfigurable user identification module operable to store a mobile identity, the mobile device being operable so as to provide mobile data communication via a mobile network selected from a set of available mobile networks, subject to the mobile identity being registered with the selected mobile network; and an account control server comprising: a memory to store identification and payment details for a user of the mobile device and a mobile identity provider to provide a mobile identity to the mobile device and to an authorisation server of a mobile network;

the account control server being arranged so that, in response to a request by a user of the mobile device to obtain data access by a particular mobile network, the account control server provides a mobile identity to the mobile device for storage by the user identification module, provides the same mobile identity to the authorisation server of that mobile network, and provides the identification and payment details relating to that user to that mobile network.

The arrangements described above, and in particular the use of an intermediary account control server, have a number of advantages over previous arrangements.

Previously, for many wireless connectivity (for example, data) service contracts, the user needs to identify him/her self with various personal details including financial details for billing purposes. This can be a cumbersome process and creates a barrier against the user switching service to another mobile network operator (MNO). The present techniques allow for the central storage of personal data by an intermediary server so that the personal data, once entered, can be used by the intermediary server to establish an MNO service contract for that user or that user's UE in any country.

The adoption of embodiments of the invention could provide a stimulus towards changing MNO by the user, improving competition between MNOs, so supporting, for example, the European Union's competition objectives for mobile communications.

An advantage is that the consumer would now only need to fill in his/her personal data one time in respect of a UE (or even, one time either in his life or at least over a long period) and then use this personal data so as to be served by any MNO in any country, possibly in respect of multiple UEs sharing the same personal data held by the intermediary server.

Further respective aspects and features of the invention are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
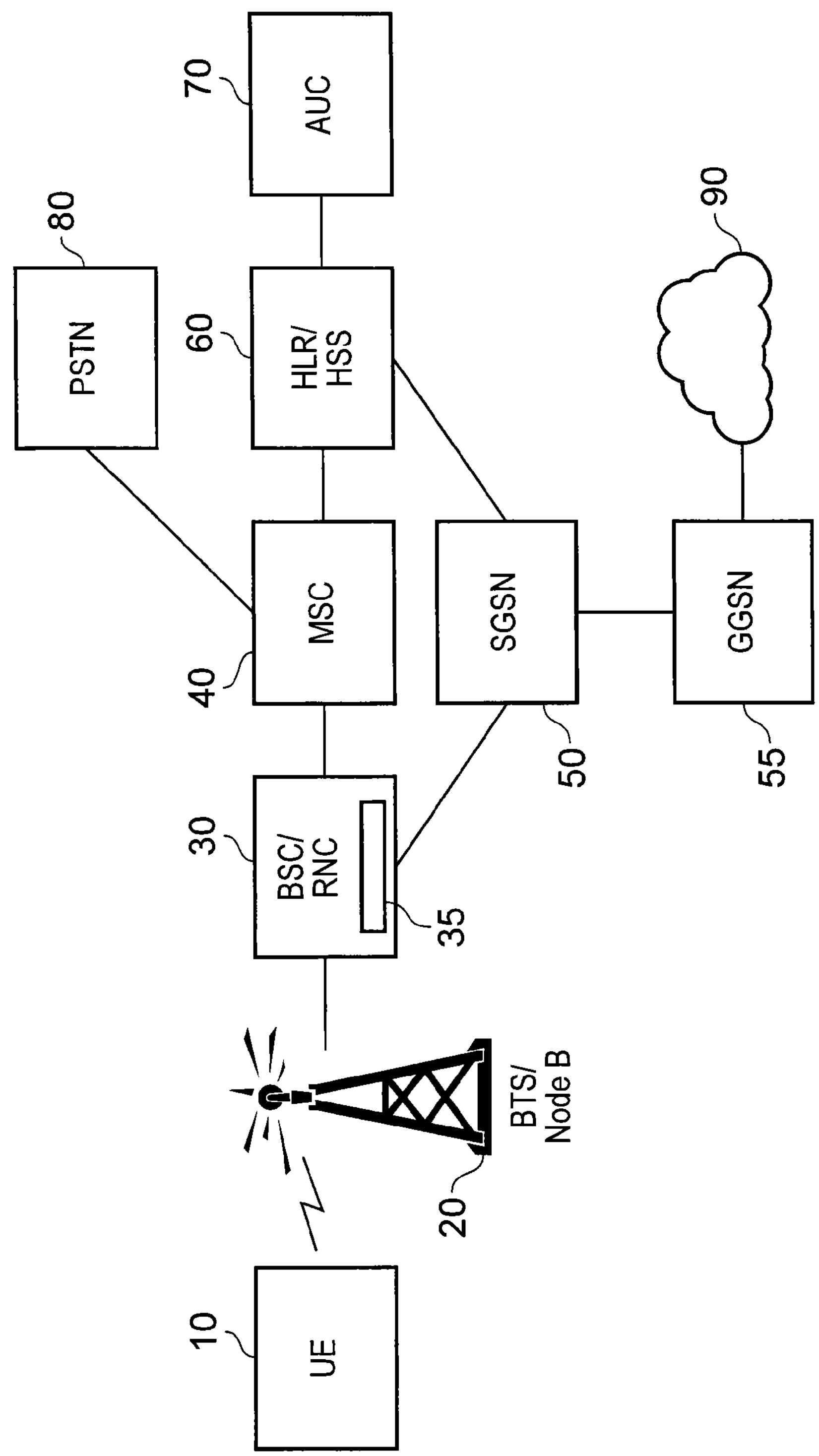
FIG. 1 is a schematic diagram of a mobile communications network.

Reference is now made to the drawings, wherein like reference numerals designate identical or corresponding parts throughout the several views.

Referring now to FIG. 1, a mobile communications network comprises a user equipment (UE) 10, a base transceiver station (BTS) 20 (the equivalent function being referred to as "NodeB" in the context of a UMTS (Universal Mobile Telecommunications System) 3G (third generation) network, but only the acronym BTS will be used in this description), a base station controller/radio network controller (BSC/RNC) 30, a mobile switching centre (MSC) 40, a serving GPRS (general packet radio service) support node (SGSN) 50, a Gateway GPRS Support Node (GGSN) 55, a home location register (HLR) 60 and an authentication centre (AUC) 70. The MSC 40 connects to a public switched telephone network (PSTN) 80. The SGSN 50 connects to the Internet 90 via the GGSN 55.

The UE includes a SIM (to be referred to here for reasons to be described below as a "RIM"). In general terms, a "UICC" (Universal Integrated Circuit Card) is a term used to describe the physical format of a card such as one embodying a SIM, whereas the term "SIM" is used here to describe the functionality of mobile identification carried out by such a device.

In operation, the UE 10 connects via a wireless link to the BTS 20 which in turn is connected (usually by a wired or other point to point link) to the BSC/RNC 30. The BTS contains equipment for transmitting and receiving radio signals, antennas, and equipment for encrypting and decrypting communications with the BSC/RNC 30.

The BSC/RNC 30 controls the operation of the BTSs 20. Typically a BSC/RNC has many BTSs under its control. The BSC/RNC allocates radio channels and controls the handover of communication with a particular UE between different BTSs. The BSC/RNC 30 also multiplexes the many different low data rate communications with individual UEs into a higher data rate connection with the MSC 40.

The BSC/RNC 30 may have an associated packet control unit (PCU) 35 which carries out some of the functions of the BSC/RNC 30, but for packet data. The BSC/RNC, BTSs and PCU are sometimes collectively referred to as the BSS (base station subsystem) or, in 3G networks, the RAN (radio access network).

The MSC 40 is primarily responsible for routing voice calls, SMS (short messaging service, otherwise known as "text") messages and circuit switched data. In respect of voice calls, the MSC 40 is able to route a call from a mobile UE to a fixed (landline) telephone using the PSTN 80. In general terms, the MSC is responsible for setting up and releasing the end-to-end connection, supervising hand-over between BSC/RNCs during a call and coordinating charging and account monitoring.

The HLR 60 (the generally equivalent function within 3G networks, as of LTE or "Long Term Evolution", being known as the Home Subscriber Server or HSS) is a central database that contains details of each mobile phone subscriber that is authorised to use the core network. There can be several HLR/HSSs in existence, though each individual mobile subscriber identity can be associated only with one logical HLR/HSS (although this can span several physical nodes) at a time.

The HLR/HSSs store details of every SIM issued by a mobile phone operator. Each SIM has a unique identifier called an IMSI which is the primary key to each HLR/HSS record. The HLR/HSS also stores MSISDNs (Mobile Subscriber Integrated Services Digital Network Numbers) which represent the telephone numbers associated with the SIMs. A SIM has a primary MSISDN which is the number used for making and receiving voice calls and SMS messages, but it is possible for a SIM to have other secondary MSISDNs, for example being associated with fax or circuit switched data calls. An IMSI is also associated with details of services applicable to that user and call divert settings associated with an MSISDN. Note that in general, a SIM need not necessarily have an associated MSISDN, if the SIM is used in the context of data access only.

The HLR/HSS 60 also connects to the AUC 70 whose function is to authenticate each SIM that attempts to connect to the network. This authentication process will be described in detail below. In brief, however, when the authentication process takes place (typically when a UE is first switched on), the UE sends its IMSI to the AUC via the HLR/HSS. The AUC replies with data derived from a so-called triplet of authentication data derived using a secure key known only to the AUC and to the SIM. This secure key is referred to as Ki. The SIM then sends a further reply to the AUC based on data from the triplet and, assuming the reply is in the correct form, the SIM (that is to say, that IMSI) is authorised for interaction with the network. The secure key Ki is securely stored on the SIM (which in the case of current SIMs takes place during manufacture), and is also securely replicated onto the AUC. These are the only copies of the secure key Ki. Ki is never transmitted between the AUC and the SIM, but instead is combined with the IMSI to produce a challenge and response for identification purposes and an encryption key called Kc for use in over-the-air communications.

The IMSI-Ki pair represents data defining a mobile identity, comprising an identification value (IMSI) which is transmitted to the mobile network as part of the network authorisation procedure, and a secure key (Ki) which is not transmitted to the mobile network as part of the network authorisation procedure, but from which the SIM derives identification data and encryption/decryption key data for use in encryption and decryption of data communication over the mobile network.

Once authentication has taken place, the authorisation triplet data is buffered at the SGSN 50. The triplet includes the encryption key Kc for use in encrypting data transfers between the UE and the network. The encryption/decryption process using Kc takes place at the currently active BSS/RAN applicable to that UE.

The Gateway GPRS Support Node (GGSN) is a main component of the GPRS network and handles matters such as IP (internet Protocol) address assignment and the like. The GGSN controls interaction between the GPRS network and external packetised networks such as the Internet 90. The GGSN checks if a user (being a recipient of a data transfer) is active, and if so, forwards the data to the respective SGSN serving that user. If the mobile user is inactive, the data is discarded. When a user initiates a data transfer, the packetised data is routed to the correct external network by the GGSN.

Figure 2:
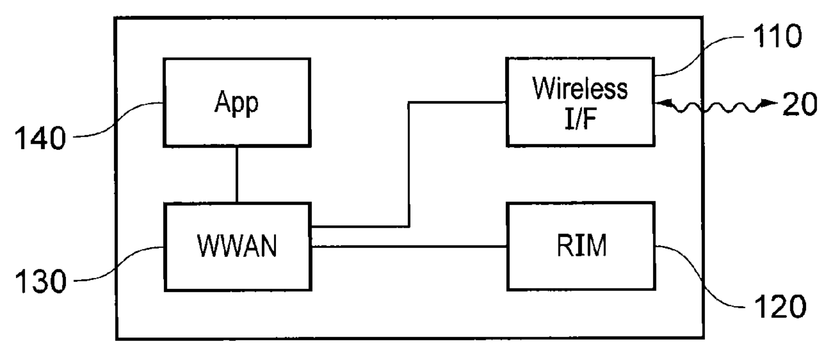
FIG. 2 is a schematic diagram of a user equipment (UE)

FIG. 2 is a schematic diagram of an example UE making use of data communications via the mobile network. The UE comprises a wireless interface 110 which provides the wireless communication with the BTS 20, a Reconfigurable SIM ("RIM") 120, a wireless wide area network (WWAN) processor 130 and application software 140. It will be understood that the application software 140 communicates with a user interface such as a keyboard, a display, a touch screen and the like. For clarity, these items are not shown in FIG. 2.

The RIM acts as an identification module for securely providing a mobile identity to a mobile data network for use in identifying mobile equipment in which that identification module is installed. It can be non-removable by the user (for example, being permanently soldered or welded into the UE and/or not being accessible from the outside of the UE without dismantling), removable by the user (for example, fitting into a standard SIM card socket accessible from the outside of the UE) or implemented in software as described below. Note that the term "reconfigurable" is used in the sense that the mobile identity as held by the RIM can be changed or configured at least once, though that one change might be from the state of not having a stored mobile identity to the state of having a stored mobile identity. In other embodiments, the mobile identity can be changed on multiple successive occasions.

Once the RIM of the UE 10 has been authorised, the operation involves the application software 140 initiating a message to be sent via the mobile network and passing that message to the WWAN processor 130 which formats it into a suitable form for transmission (for example as so-called IP data packets). Using a key Kc supplied by the RIM and an "A5" encryption algorithm, the WWAN processor 130 encrypts the data packets. The encryption key Kc used for encryption is the one that was established during the authorisation process. The encrypted data is then passed from the WWAN processor 130 to the wireless interface 110 for transmission to the BTS 20. With regard to messages received from the network, data is transmitted from the BTS 20 to the UE and is received by the wireless interface 110. The data is decrypted by the WWAN processor using a key Kc supplied by the RIM 120, and is formatted (for example, depacketised) to be passed to the application software 140.

Figure 3:
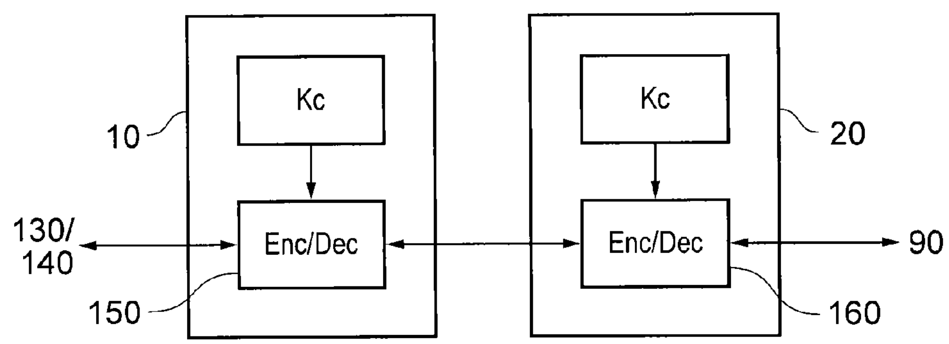
FIG. 3 is a schematic diagram of a data communication process via the network of FIG. 1.

FIG. 3 is a schematic diagram of a data communication process via the network of FIG. 1. Here, the encryption and decryption processes are illustrated in a schematic form. At the UE 10, data passing to and from the application software 140 (via the WWAN processor 130) is subject to an encryption/decryption process 150 under the control of the key Kc. The encrypted data is passed via the mobile network to the BTS 20 where it is decrypted using an encryption/decryption process 160, again with reference to the key Kc. The clear (no longer encrypted) data is then transferred to and from the Internet 90. Accordingly, the data path between the RIM 120 and the BTS 20 carries data which is encrypted using the key Kc, whether that data is being transmitted to the UE or from the UE. Data outside of that encrypted path is clear data.

Figure 4:
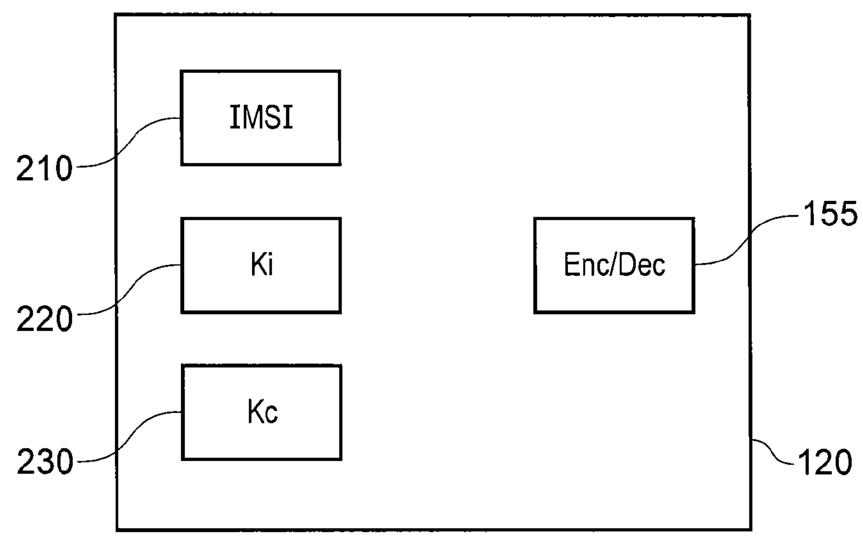
FIG. 4 schematically illustrates a SIM.

FIG. 4 schematically illustrates a RIM. The term "RIM" stands for "reconfigurable (subscriber) identification module", and this identification function is carried out by virtue of the RIM carrying a unique IMSI and associated respective unique secure key Ki associated with a subscriber. The significant features of the RIM shown in FIG. 4 are as follows: secure storage (or at least a mobile identity storage controller for accessing memory, which would normally be on the RIM, which securely stores data defining the IMSI) for the IMSI 210, secure storage 220 (or at least a storage controller as above) holding the secure key Ki, memory storage 230 which holds the encryption key Kc and other temporary data and an encryption/decryption function 155 which also acts as a network interface for generating data derived from a mobile identity for transmission to a mobile network during a network authorisation procedure, and for handling acknowledgement data received back from the mobile network indicating whether authorisation was successful based on that mobile identity. The encryption/decryption function 155 carries out various different functions at different stages in operation. At least three encryption algorithms are provided. In brief, the two of these directly relating to the RIM are referred to as the A3 algorithm and the A8 algorithm. The A5 algorithm is used by the WWAN processor 130 and will be described for comparison.

The A3 algorithm is a one-way function used to compute a signed response (SRES) during the authentication process. The generation and use of the SRES will be described further below. The A3 algorithm resides on the RIM and at the AUC.

The A5 algorithm is a two-way function used by the WWAN processor 130 to encrypt and decrypt data that is being transmitted over the wireless interface, that is to say, it is the function which encrypts and decrypts data using the encryption/decryption key Kc described with reference to FIG. 3.

The A8 algorithm is a one way function used to generate the 64-bit key Kc. The generation of the key Kc will be described further below. The A8 algorithm also resides on the RIM and at the AUC.

Note that in 3G networks, an enhanced authentication algorithm (AKA—Authentication and Key Agreement) is used, and other algorithms than the A5 algorithm may be used. Other techniques, such as using a 128 bit CK (Ciphering Key) rather than the 64 bit Kc, may apply. Differences between 3G and 2G (second generation) networks are widely published, for example in http://www.3gpp.org/ftp/tsg_sa/wg3_security/_specs/33120-300.pdf, which document is incorporated herein in its entirety by reference.

Figure 5:
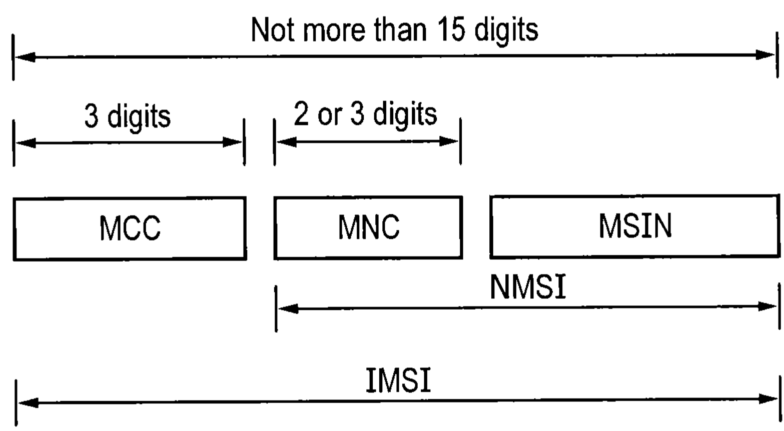
FIG. 5 schematically illustrates the structure of an IMSI (International Mobile Subscriber Identifier)

FIG. 5 schematically illustrates the format of an IMSI. The term "IMSI" stands for "international mobile subscriber identifier" and represents a unique identification associated with all users of the network. It is stored as a 64-bit field in secure storage 210 within the RIM and, when required, is sent by the UE to the network.

The maximum length of an IMSI is 15 decimal digits. The first three digits represent a mobile country code or MCC which identifies the country of origin of the subscriber's RIM. The next two or three digits represent a mobile network code or MNC which identifies a network company which provided (or possibly, which owns) the RIM. The final digits provide a mobile subscriber identification number or MSIN which is unique to a particular RIM within that network and that country defined by the MNC and MCC. The MNC and MSIN together provide a national mobile subscriber identification or NMSI.

Figure 6:
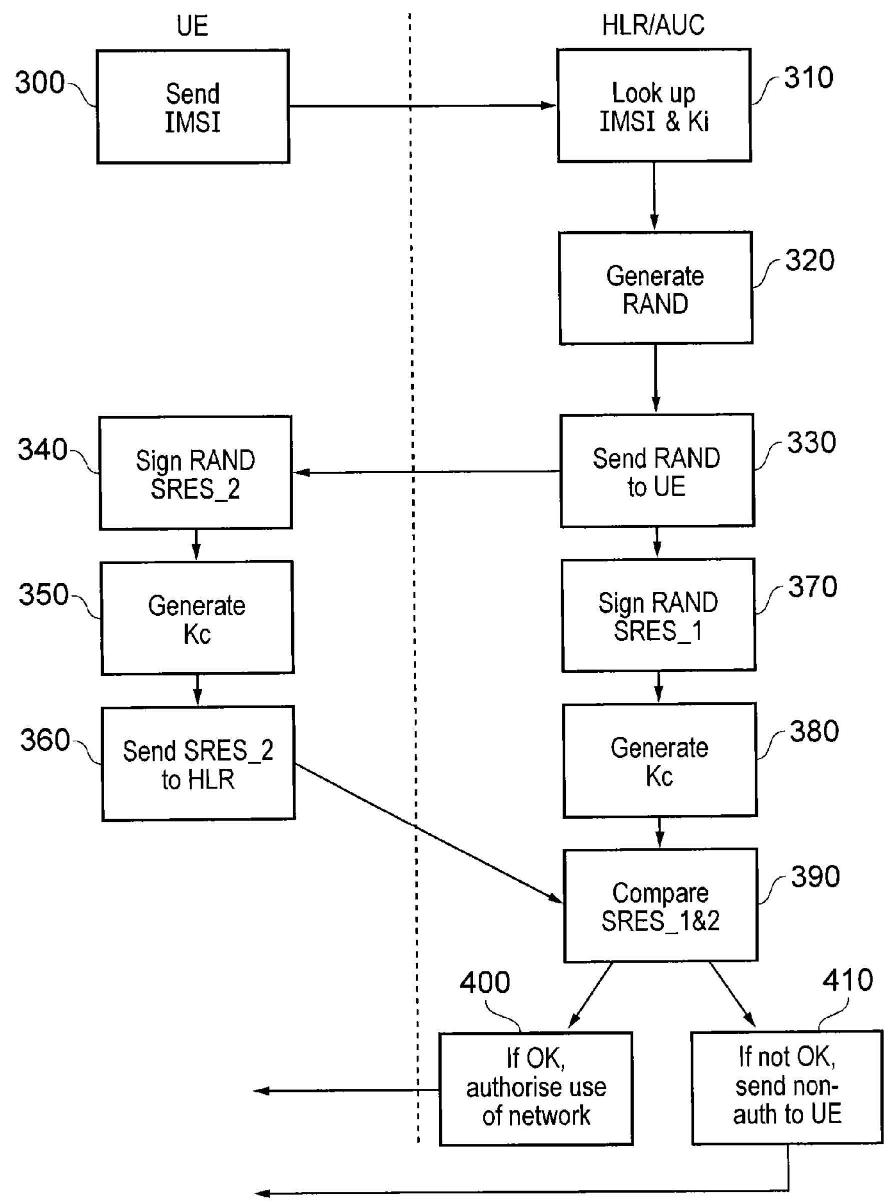
FIG. 6 is a schematic flowchart illustrating an authorisation process between a UE and the network.

FIG. 6 is a schematic flowchart illustrating an authorisation process between a UE and the network. Steps shown to the left of the vertical broken line are carried out at the UE 10 and steps shown to the right of the vertical line are carried out at the HLR/HSS 60 and/or the AUC 70.

At a step 300, the UE sends its IMSI to the network. In response to receipt of the IMSI, the HLR/HSS consults the AUC to request that the AUC generates an authorisation triplet. The AUC 70 consults its database to find the secure key Ki at a step 310. At a step 320, the AUC generates a single-use random number, RAND. At a step 330, the AUC sends the random number RAND to the UE. The UE receives the random number RAND and, at a step 340, signs the number RAND with the RIM's secure key Ki to generate a signed response SRES_2.

The RIM then generates the encryption/decryption key Kc by applying the A8 algorithm to the number RAND and the secure key Ki, at a step 350. As mentioned above, the encryption/decryption key Kc is used later (subject to a successful authorisation) for encrypting and decrypting communications via the mobile network during the present session. At a step 360, the UE sends the signed response SRES_2 back to the network.

Meanwhile, the AUC also generates a signed response SRES_1, by applying its stored version of the secure key Ki relating to that IMSI to the number RAND, at a step 370. As a step 380, the AUC generates the encryption/decryption key Kc by applying the A8 algorithm to the number RAND and the secure key Ki.

As a step 390, the AUC compares the signed responses SRES_1 and SRES_2. If the IMSI and Ki pair held by the RIM of the UE matches the IMSI and Ki pair held by the AUC, and bearing in mind that the versions of the A3 algorithm used by the RIM and the AUC are the same, then the signed responses SRES_1 and SRES_2 should be identical. If they are identical, then the RIM should be authorised for use during a current session on the network. Of course, authorisation is not provided if an IMSI has already been authorised for a currently open session on the network. But assuming that the IMSI is not already authorised for a currently open session, and the two signed responses are identical, then at step 400, the RIM holding that IMSI is authorised to use the network and the encryption/decryption key Kc is passed to the SGSN 50. A message is sent by the HLR/HSS 60 to the UE 10 to indicate that authorisation has been granted.

On the other hand, if either the IMSI is party to a currently open session that has already been authorised, or the two signed responses do not match, then the IMSI is not authorised for a connection session on the network. In this case, a non-authorisation message was passed to the UE a step 410, and the version of the encryption/decryption key Kc generated by the AUC is not passed to the network for use in encrypting or decrypting communication with that UE.

Here, it is worth discussing "activation" and "registration" in respect of an IMSI. At activation (first time entry in the HLR/HSS), an IMSI is activated in the HLR/HSS immediately, so the activation cost of € 1-10 is due straightaway as the cost is related to licensing and resource usage. This process can be paid for by the manufacturer or the MNO, for example. Ways of mitigating this cost for a manufacturer are discussed in patent application number GB1110236.5 (which document is incorporated herein in its entirety by reference) and are applicable to the embodiments of the present invention.

A new IMSI can be provided (see below) for which the user must apply a registration process. At this stage, the user registers the new IMSI to use network services and establishes a one-to-one relationship between the new IMSI (known to both the RIM and the MNO), the user's account and possibly also an identification of the UE in which the RIM is installed.

Figures 7, 8, 11:
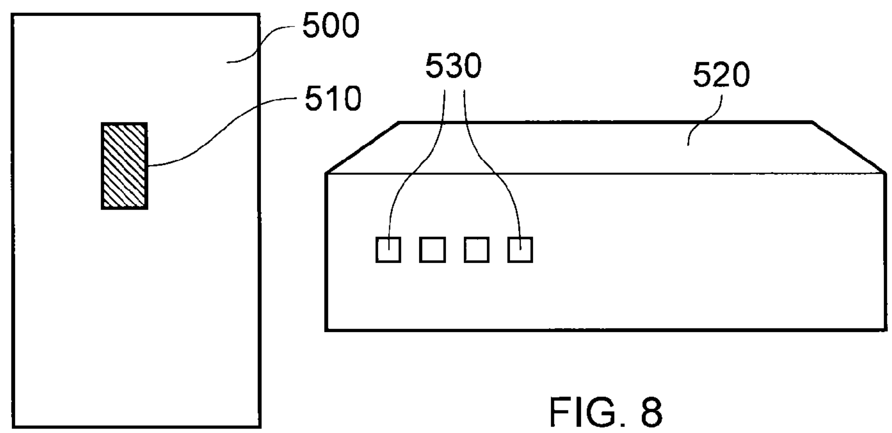
FIG. 7 schematically illustrates a circuit board having an embedded SIM.
FIG. 8 schematically illustrates a UE including the circuit board of FIG. 7.
FIG. 11 schematically illustrates an example of a data entry screen at a UE.

FIG. 7 schematically illustrates a circuit board 500 having an embedded RIM 510. Such a circuit board could be mounted within a UE of the type shown very schematically in FIG. 8, which provides an outer casing 520, possibly with controls or displays 530, but without providing access for the user to remove or replace the RIM 510. Alternatively a removable RIM can be used with the same functionality as described throughout the present specification, except that the RIM can be removed (and optionally replaced) by the end-user. This arrangement would allow compliance with competition law requirements for open internet access with only one SIM, and/or could be a useful solution for device vendors who do not wish to change their hardware designs but who still want to make use of the RIM functionality. Another alternative is a software RIM as described later.

In general terms, it is envisaged that RIMs could be incorporated within many types of UE, ranging perhaps from more conventional data handling devices such as personal digital assistants through to applications of data communication which are perhaps less common at the time of filing the present application, such as satellite navigation devices or microwave ovens. The particular type of UE in which the RIM is provided is not technically relevant to the present invention. The UE containing the RIM can be considered as a mobile device having a configurable (or reconfigurable) user identification module operable to store a mobile identity, the mobile device being operable so as to provide mobile data communication via a mobile network selected from a set of available mobile networks, subject to the mobile identity being registered with the selected mobile network.

Figure 9:
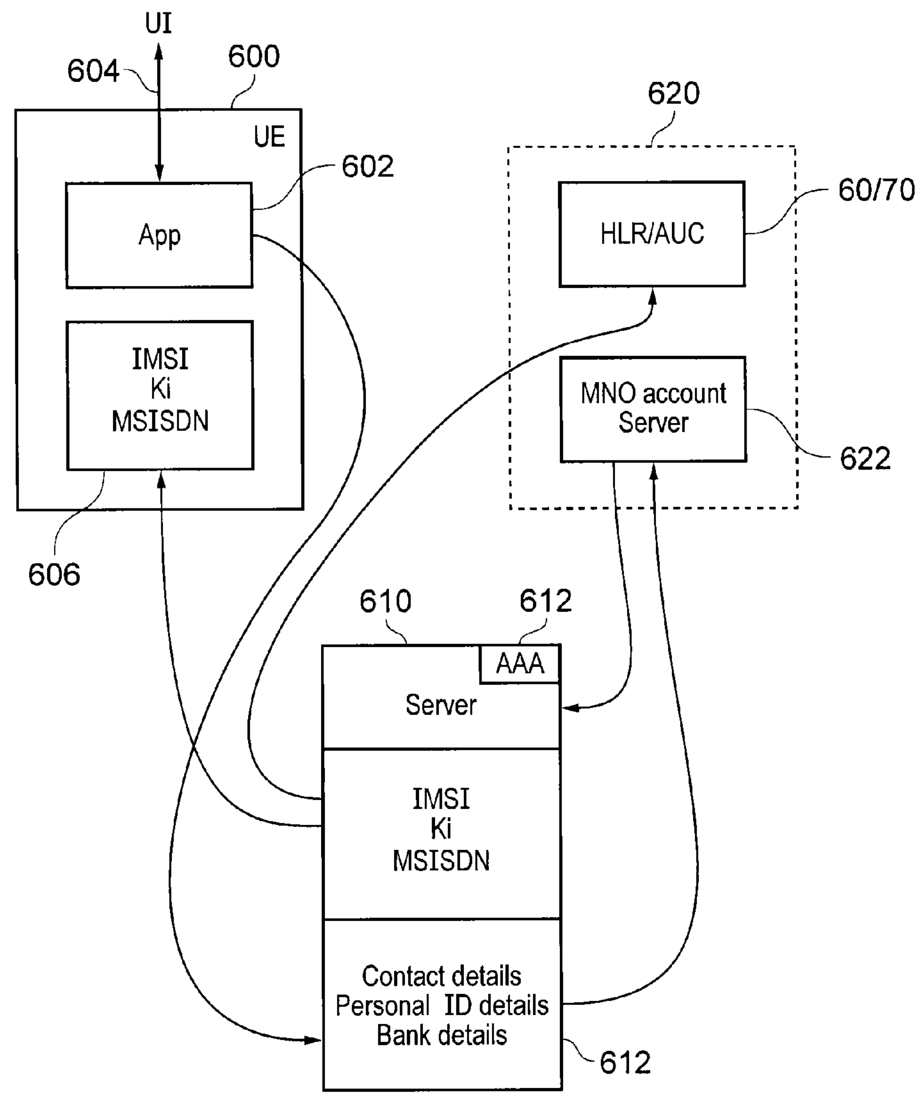
FIG. 9 schematically illustrates information flow between a UE, a server and a mobile network operator (MNO)

FIG. 9 schematically illustrates information flow between a UE 600 and a mobile network operator (MNO) 620.

The description which follows relies on various technical features of the devices shown in FIG. 9:

1. Firstly, a secure data communication channel is required between the UE and the server, and between the server and the MNO. This data communication channel could be provided (as between the UE and the server) by encrypted communication over a mobile data channel, and/or by encrypted communication over a separate network or Internet channel, for example making use of a wired or wireless Internet connection (not shown). Techniques for achieving this will be described below.

In general terms, the provisioning of the secret key needs to be carried out in a very secure manner, as the secret key is fundamental to the secure operation of the mobile device and the prevention of fraud. Various techniques are available for achieving this. In one example, secure data packets in a proven over-the-air (OTA) data transfer mechanism such as the ETSI standard TS102 225 can be used, or a secure internet transfer can be employed. Other possibilities include providing multiple mobile identities at the UICC of the UE 600, so that the only data that needs to be sent between the server 610 and the UE 600 is data selecting one of those multiple identities. In a further option, a so-called root key can be provided at the UICC and the server 610, with secret keys being derived from the secret route key according to a certain algorithm and seed data (which might even be the MNC or MCC of the new identity) sent from the server 610 to the UICC of the UE 600.

2. Secondly, the server 610 has to be able to store and retain highly confidential information in a secure manner. This is carried out using known encryption and security techniques.
3. Thirdly, the UE and/or the UICC within the UE 600 has to be able to accept and store data relating to the mobile identity associated with that UICC, which data can include secret information such as the secret key Ki. In other words, the mobile identity currently associated with the UICC of the UE 600 can be altered by means of data downloaded from the server 610.

Figure 10:
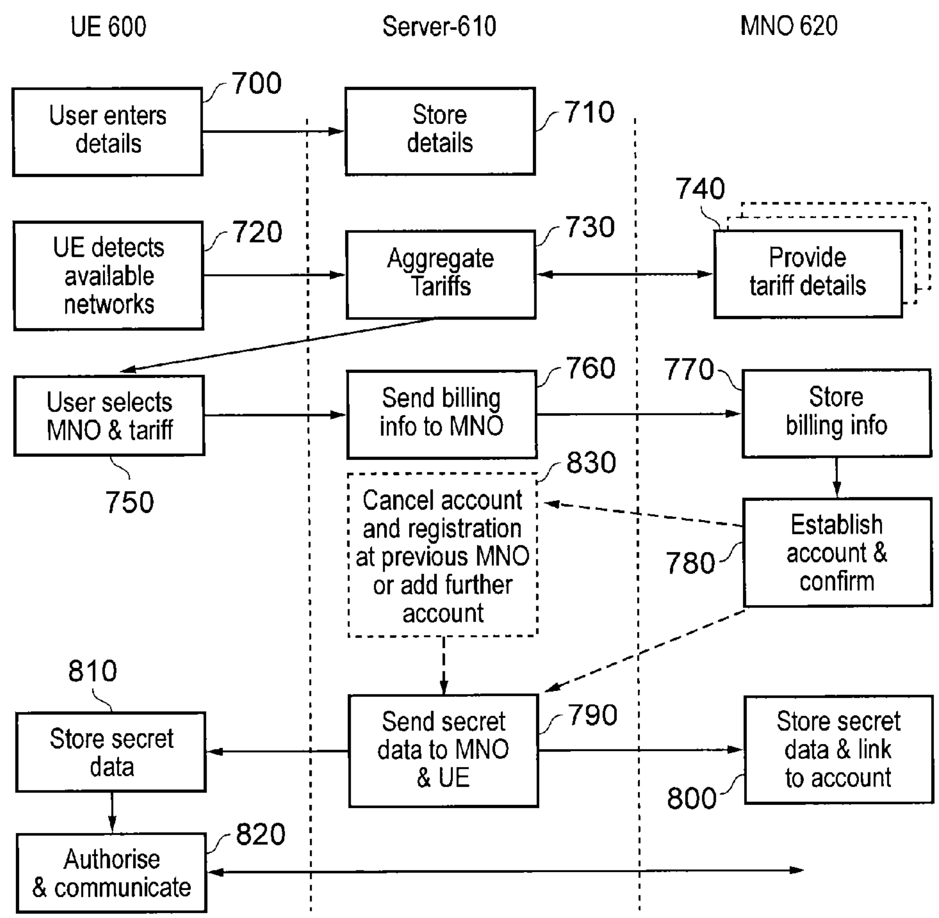
FIG. 10 is a schematic flowchart illustrating steps involved in the information flow between a UE, a server and an MNO.

Referring to FIG. 9 and the flowchart of FIG. 10 (which schematically illustrates steps carried out by the UE 600, the server 610 and the MNO 620, each of the three devices being represented by a separate column within the flowchart of FIG. 10), a first stage involves the user of the UE 600, or a third party, or a mobile phone store employee, entering personal details, at a step 700, into an application program 602 running on the UE 600. The user makes use of a user interface 604 which may provide, for example, a keyboard, a display and a cursor control device (not shown). The UE 600 establishes a secure data connection to the server 610 and transmits the personal details entered by the user to the server 610. At a step 710 the server stores those personal details in a secure storage area 612.

As an alternative, a third party (such as a parent or friend) could enter the personal details on behalf of a user, for example as part of the purchase of a gift.

As a further alternative, the user could enter his/her personal details at the step 700 by a separate Internet access route (a secure web page) or at a physical point of sale, for example at an MNO shop or other mobile data device shop.

The personal details to be provided can include, for example, name, address, bank account details and proof of identity (for example, a scanned image of an identification document such as a passport or driving licence). In some national jurisdictions, this type of identification cannot be done at home—the details have to be provided to an employee of the identifying organisation, for example, the data would be provided in-store to an employee of a mobile phone store, who would then enter the details.

An example of the display screen which may be associated with the user interface 604 is shown schematically in FIG. 11. In that Figure, a display screen 606 includes data entry fields for a user's name, address and bank account details such as bank branch code and account number, along with an opportunity to browse for and upload a scanned image of the user's identification documents if required.

The entry of user details needs to take place only once in the overall process. In FIG. 10, the steps 700 and 710 are shown as taking place before the rest of the process. However, the steps could take place at a later stage in the process, for example as part of a step 750 to be described below.

At a step 720, the UE detects available mobile networks. This is handled in a conventional manner, with the wireless interface 110 detecting available wireless signals in the vicinity of the UE, and the WWAN processor 130 analysing data derived from those wireless signals to establish which mobile network operators are available for use by the UE 600, subject of course to authorisation. The UE sends data via the secure data communication link to the server 610 indicating which mobile networks have been detected at the step 720.

At a step 730, the server 610 aggregates which mobile network tariffs are available to the UE based on the detected available networks and any policy set by the user and/or UE. This may involve interacting with multiple mobile network operators at a step 740, so as to query those operators about their respective tariffs. The server 610 sends the tariff information back to the UE. In this way, the server 610 may be considered to be operable to query one or more of the available mobile networks to detect user tariffs associated with those networks, and to provide the detected user tariffs to the mobile device for user selection of a tariff.

The policy referred to in respect of the step 730 may be a policy set by a user, for example "I require only pre-paid mobile contracts" and/or a policy set by the UE manufacturer and embodied within the UE, such as "this device may connect only via the MNO XYZ".

In this way, in embodiments of the invention the server 610 is operable to detect whether a user policy or a mobile device policy stored at the mobile device defines a subset of the available mobile networks or tariffs, and to provide only the subset of tariffs defined by the policy to the mobile device.

Note that the interaction with the MNOs at the step 740 can be carried out in advance—for example, the server 610 could query all available MNOs overnight each day so as to obtain their latest tariff details, in order to have this information ready in case a step 730 is required at any time.

At the step 750, the user of the UE 600 selects an MNO and a tariff. The UE sends data defining the selected tariff to the server 610. Further detail with regard to the step 750 is provided in the flowchart of FIG. 12, to be discussed below.

At a step 760, the server 610 sends the billing information (which it had previously stored at the step 710) to a billing server 622 of the MNO 620. The billing server stores the billing information at a step 770 and, at a step 780, establishes a billing account in the user's name, confirming this to the server 610.

Part of the confirmation at the step 780 can be an undertaking to pay commission to the provider of the server 610, for the introduction or referral of the business represented by the newly established user account. This could be in the form of a one-off payment or an ongoing regular payment (at a flat rate or dependent upon the costs incurred by the user) for as long as the user maintains the account.

In response to the confirmation, at a step 790 the server 610 sends information defining a mobile identity to the MNO and to the UE. This information includes secret data (for example, the key Ki) along with non-secret data such as a corresponding IMSI and possibly a corresponding telephone number (MSISDN).

At a step 800, the HLR/HSS/AUC (60/70) of the MNO stores the information defining the mobile identity, including the secret data, and links the stored information to the newly-established user's account. Similarly, at a step 810, the UE stores the information defining the mobile identity, including the secret data, in secure storage 606 at the UE, in such a way that the mobile identity and the secret data are available to the UICC of the UE for use in a mobile network authorisation process.

Finally, at a step 820, the UE carries out an authorisation process with respect to the selected MNO, using the process described above with reference to FIG. 6.

The process as just described assumes that the user had not already established an account with an MNO. In embodiments of the invention, the secure storage 606 can be arranged only to allow a single data write operation. This would allow the user to establish his/her own choice of MNO on one occasion, and to receive a set of information defining a mobile identity in respect of that one account. However, the secure storage 606 could allow repeated write operations, so that the user could re-define or "re-provision" the UICC of the UE from time to time so as to change from one MNO to another.

A part of such a re-provisioning operation would require the cancellation of the data entries made at the previous MNO. This involves the server 610 sending a message to the previous MNO, and in particular to the account server 622 and the HLR/HSS/AUC 60/70 of the previous MNO. The message cancels the account held by the user and, optionally, cancels the registration of the IMSI and related data by the HLR/HSS/AUC of the previous MNO. In an example embodiment, such a step would occur as a step 830 in between the step 780 and the step 790. This is shown schematically in FIG. 10 by a separate route from the step 780 to the step 790 via the additional step 830, in broken line.

An alternative case to be considered in respect of the step 830 is where the user simply suspends (but does not close) an account and opens a new account at another (or the same) MNO. This arrangement is particularly suited to data-only access, in which there are no problems over changes to the MSISDN number associated with such a procedure.

Note also that in normal operation, the user would not initiate the steps 720 onwards in FIG. 10. That is to say, it is relatively uncommon for a user to change MNOs, and generally not a day-to-day activity. So, on a normal day of operation of the UE, being a day on which the user does not have in mind to change MNOs, the steps 720 onwards of FIG. 10 need not take place.

Having said this, it may be that the steps 720, 730 and a part of 750 could take place on a scheduled basis or by prompting of the server 610 from time to time, so as to suggest to the user that the user may wish to switch to a different tariff, contract or MNO. So this would form a kind of advertising material on behalf of the server 610 and/or a potential new MNO. The operator of the server 610 may receive payment from a new MNO in respect of a user switching to that MNO. The payment may be conditional upon the switched user remaining with the new MNO for a minimum period, or the newly selected contract could have a minimum period of operation, so these periods could determine when the server 610 next prompts the user to change MNO, contract or tariff in this way. The server would do so after or shortly before the expiry of either or both of these minimum periods.

The secure storage 606 can be implemented on the UICC, in a similar way to the storage 210, 220 and 230 shown in FIG. 4. In other embodiments, the secure storage 606 can be provided on the UE, with the UICC being capable of accessing data stored in the secure storage 606 in a secure manner.

The server 610 obtains the mobile identity-defining information (which in embodiments of the invention comprises an International Mobile Subscriber Identifier number and an associated secret encryption key) as follows.

The MSISDN remains, as far as possible, common to the user. That is to say, different mobile identities provided to the UE 600 and the MNO 620 by the server 610 will use the same MSISDN number, so that the user may maintain a consistent telephone number. For data access only, the MSISDN is irrelevant and can change without affecting the user's operation. Or the RIM may not even have an associated MSISDN. But if the RIM does have an associated MSISDN, the cancellation of any previous registrations (for example, at the step 830) is important to avoid inconsistencies across different mobile networks.

Of course, in instances where the user moves from one country to another, a different MSISDN will be provided in respect of any newly-entered countries. In this situation, the step 830 is not required, in order that the user may maintain multiple user accounts, one for each country which the user visits.

As regards the IMSI and the key Ki, the server 610 can generate these using known IMSI and Ki generation algorithms.

The transfer of secret keys between the server 610, the UE 600 and the MNO 620 at the step 790 can be handled as follows, bearing in mind that many specific details are to be found in respect of devices such as the so-called embedded UICC (eUICC).

The techniques assume that the user already has an operational mobile identity, for example the identity A to be discussed below with reference to FIG. 13. A connection is formed between the UE 600 and the server 610 over an internet connection. So there is a need to secure this connection.

As a first possibility, the UE connects to the server using a WWAN mobile data network connection based on a currently operational mobile identity. The transfer can then happen via traditional methods such as OTA or via OTI (over the internet), with possible involvement of mechanisms such as BIP (Bearer Independent Protocol).

As a second possibility, the UE communicates with the server 610 via a so-called Authentication, Authorization and Accounting (AAA) server 612, which may be implemented as a function of the server 610 (as it is shown schematically in FIG. 9) or as a separate AAA server connected to the server 610 by a secure data connection. The UE uses the so-called EAP-SIM (Extensible Authentication Protocol [Method for GSM] Subscriber Identity Module).

EAP-SIM uses a SIM-based authentication algorithm between the UE and the AAA server associated with the server 610, with the AAA server providing mutual authentication between the UE and the server 610. In EAP-SIM the communication between the RIM and the AUC replaces the need for a pre-established secret between the client and the AAA server. This technique can provide a secure data link between the UE and the server 610 and can be used to exchange the secure keys over a secure non-WWAN access medium (this is used to provide approximately the same level of security as a transfer via a WWAN access channel).

A conventional secure data link is established between the server 610 and the HLR/HSS/AUC of the MNO 620.

As a third possibility, the UE connects to the server 610 using known arrangements such as the so-called PEAP (Protected Extensible Authentication Protocol) or LEAP (Localized Encryption and Authentication Protocol) systems (and having already a secure token at hand—not the SIM Ki).

Both of the second and third possibilities mentioned above can be used by a user wishing to changing his RIM at home over a non-WWAN access medium and/or for the case in which a store keeper changes the RIM (for countries which do not allow the authorisation of a user at home over the internet) and/or another third party changing the RIM.

Figure 12:
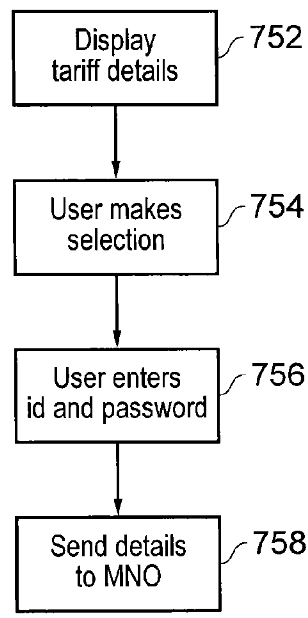
FIG. 12 is a schematic flowchart illustrating steps involved in a user selecting a particular MNO and tariff.

FIG. 12 is a schematic flowchart illustrating further steps involved in a user selecting a particular MNO and tariff. These steps correspond to the generic step 750 shown in FIG. 10.

Referring to FIG. 12, at a step 752, the user interface 604 of the UE 600 displays details of the various tariffs which have been indicated as available by the server 610 at the step 730. At a step 754, the user makes a selection using user input controls of the user interface 604.

At a step 756, the user enters a user identifier and password, again using the user interface 604. This secure identification process is needed to avoid unwanted alterations to the user's mobile identity or billing accounts. The password and user identifier can be set, for example, at the step 700 when the user first enters his/her personal details. Alternatively, the password and user identifier can be allocated by the server 610, for example in response to a successful execution of the step 710, with the password and user identifier being transmitted to the user by the secure data communications channel, by e-mail, by posted letter or the like.

Once the user has successfully made this identification, using the user identifier and the password, details of the selected new tariff and/or MNO are sent by the UE 600 to the server 610. Note that the checking of the user password can be handled by the application 602 running at the UE 600, or by a secure interaction with the server 610, or a combination of the two.

Accordingly, the server 610 can be considered as an account control server comprising: a memory to store identification and payment details for a user of the mobile device and a mobile identity provider to provide a mobile identity to the mobile device and to an authorisation server of a mobile network, arranged so that, in response to a request by a user of the mobile device to obtain data access by a particular mobile network, the account control server provides a mobile identity to the mobile device for storage by the user identification module, provides the same mobile identity to the authorisation server of that mobile network, and provides the identification and payment details relating to that user to that mobile network.

Figure 13:
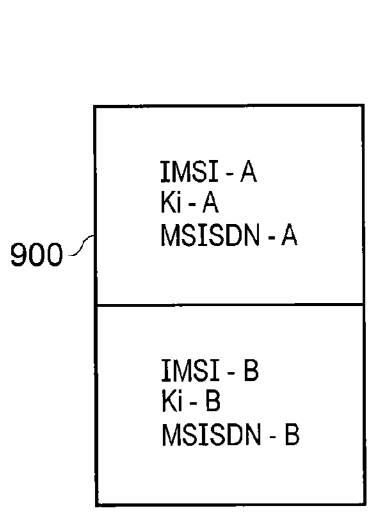
FIG. 13 schematically illustrates the storage of multiple mobile identities by a SIM device.

FIG. 13 schematically illustrates the storage of multiple mobile identities by the UICC of the UE 600.

In particular, in FIG. 10, two sets of mobile identity data are stored in secure storage 900, namely a set A and a set B. The reason why to such sets can be useful will now be described.

When the user first purchases the UE with the embedded UICC, the user may need some way of establishing a first mobile data network connection in order for the secure interaction with the server 610 to be initially established. The mobile identity A, which may be referred to as a "boot" mobile identity and which corresponds to a particular initial MNO and tariff (for example, a pay-as-you-go tariff with an initial starting credit sufficient to carry out the initial registration of the UE) is used in this first instance. At this stage, the mobile identity B (the "service" mobile identity) may be unpopulated. Then, when the user first undertakes the process shown in FIG. 10, the mobile identity A is not deleted but is rendered dormant, as long as the mobile identity B is populated. If the user repeats the process shown in FIG. 10, that is to say the user replaces a current MNO with a new MNO, so that the step 830 has to be followed, then it is the mobile identity B which is over-written by the newly arranged mobile identity provided by the server 610 at the step 790. Accordingly, the RIM is operable to overwrite a current mobile identity with a mobile identity newly received from the account control server (such as the server 610).

Alternatively, further mobile identities may be written to the RIM without overwriting previous ones.

In embodiments of the invention, the boot mobile identity (A) remains active—at least in the sense that it is used for handling the data exchanges with the server 610 involved in any transition of the other mobile identity (B) from one MNO, contract and/or tariff to another. In other embodiments of the invention, the boot mobile identity (A) is also used for handling any communication with the server 610, to avoid the user necessarily being charged for such data access, so that the RIM may be considered as being operable to store a primary mobile identity for providing mobile data communication and a further mobile identity, the reconfigurable user identification module being arranged to use the further mobile identity at least for communication with the account control server in respect of changes to the primary mobile identity.

Figure 14:
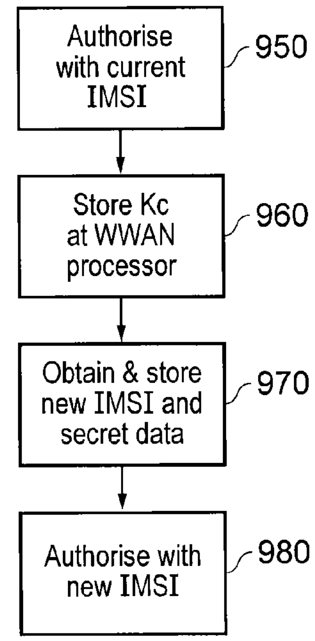
FIG. 14 schematically illustrates the steps involved in accessing a mobile network with a first mobile identity before switching to a second mobile identity.

At the time that the mobile identity stored by the UICC of the UE 600 is changed to a new mobile identity, care needs to be taken to ensure that there is continuity of network availability for the purposes of implementing the change. FIG. 14 schematically illustrates steps involved in accessing a mobile network with a first mobile identity before switching to a second mobile identity.

At a step 950, the UE 600 carries out an authorisation procedure (FIG. 6) in respect of a current mobile identity including a current IMSI. When the key Kc is established (the step 350 described above) it is stored at the WWAN process 130 for use in encrypting and decrypting data communication across the mobile network.

Assume now that the UE 600 follows the steps of FIG. 10, culminating in the selection of a new MNO at the step 750. In this case, at a step 810, the UE 600 will receive a new mobile identity from the server 610. This corresponds to a step 970 in FIG. 14. The newly received mobile identity can be used to overwrite the previous mobile identity without necessarily interrupting communication by the WWAN processor 130. The current communication session is interrupted only when the UE 600 attempts to authorise with the new MNO at the step 820 (corresponding to a step 980 in FIG. 14). Having said this, the cancellation of the registration at the previous MNO at the step 830 may also have the effect of prematurely terminating the current communication session. Once the authorisation of the step 820 has been completed, the UE 600 can communicate with the MNO 620 (and can continue to authorise and communicate in an ongoing manner).

The arrangements described above, and in particular the use of the intermediary server 610, have a number of advantages over previous arrangements.

Previously, for many wireless connectivity (for example, data) service contracts, the user needs to identify him/her self with various personal details including financial details for billing purposes. This can be a cumbersome process and creates a barrier against the user switching service to another MNO. The present techniques allow for the central storage of personal data by an intermediary server (for example, the server 610) so that the personal data, once entered, can be used to establish an MNO service contract in any country.

The adoption of embodiments of the invention could provide a stimulus towards changing MNO by the user, improving competition between MNOs, so supporting, for example, the European Union's competition objectives for mobile communications.

An advantage is that the consumer would now only need to fill in his/her personal data one time in respect of a UE (or even, one time in his life or over a long period) and then use this personal data so as to be served by any MNO in any country, possibly in respect of multiple UEs sharing the same personal data held by the server 610. In this way, in embodiments of the invention, the server is arranged to provide the user's identification and payment details to other data communication providers.

While the description above has referred to RIMs, IMSIs and Kis, these terms are sometimes considered to relate to particular network standards or protocols. It will be appreciated that any type of identification module and mobile identity data fulfilling the basic requirements of identifying a node on a data network may be used in embodiments of the invention. In particular, where appropriate, the term "RIM" or "RIM card" can be replaced by "UICC" in the description above.

The discussion above has related generally to physical RIM devices. Hardware RIMs of this type rely on physical security provided by a secure hardware arrangement to store and handle secret keys and the like in a tamper-proof manner. However, it is possible to implement a RIM as one or more software processes, which in embodiments of the invention are implemented by a secure data processing device, to provide a "software RIM".

With a software RIM, a processor within the secure data processing device (forming part of the UE) has a secure memory and stack, and routes software calls for RIM functionality internally using the secure memory and stack, so as to avoid problems of tampering with the secure data.

Using such a software RIM as the open RIM, it could be considered that the functionality or the mobile identity of the RIM is such that the software RIM can provide that IMSI-Ki pairs are downloadable. It has been suggested that MNOs may be keen to avoid software-based RIM arrangements, because they would in fact make it easier for users to switch providers and could remove some of the control that the MNOs currently maintain over subscribers and subscriber data. Accordingly, a software RIM could be used as the RIM. This arrangement can be used to change the MNO accessed by the RIM function. Alternatively, of course, a hardware RIM (removable or not) may be used.

The arrangements described above can provide a centralised repository for user identity and authorisation information in general. In particular, the server 610 can provide a central, single, sign-on and authentication service for any data access bearer, such as a fixed Internet connection provider, a wireless Internet connection provider or a mobile data communications provider. In this way, the server 610 can complement and/or enrich the management of mobile devices in general.

In part, this may be achieved by various so-called stakeholders accrediting the server 610 to provide authentication and identification function is for users. Examples of such stakeholders include countries (in the sense of governmental authorities responsible for managing the identification of individuals); MNOs; retail shops and chains of retail shops; and others such as content providers, application ("app") stores, device manufacturers and the like.

The techniques described above may be implemented in hardware, software, programmable hardware such as application specific integrated circuits or field programmable gate arrays, or combinations of these. It will be understood that where the techniques are implemented, at least in part, by software or the like, then such software and providing media (such as non-transitory storage media) by which such software is provided are considered as embodiments of the invention.

Although the techniques have been described in respect of devices using data services, the UE could comprise one or more audio transducers and an audio data encoder and decoder; and at least some of the data transferred over the mobile data network could comprise encoded audio data handled by the audio data encoder and decoder.

It will be appreciated that although examples have been described with respect to particular mobile telecommunications standards, the invention is not limited to a particular standard, and is applicable to various arrangements in which an identification module carries a mobile identity. Examples of identification modules in various formats include the Universal Integrated Circuit Card (UICC) in UMTS, while the Removable User Identity Module (R-UIM) is used in some CDMA (code division multiple access) systems.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

I claim:

1. A mobile data communications system comprising:

a wireless mobile device including first circuitry configured to: store a mobile identity, output for display to a user a set of available wireless mobile networks, receive from the user a selection of one of the available wireless mobile networks, and provide mobile data communication via the selected available wireless mobile network, subject to the mobile identity being registered with the selected available wireless mobile network; and an account control server including: a memory to store identification and payment details for the user of the wireless mobile device, and second circuitry configured to: query one or more of the available wireless mobile networks to detect user tariffs associated with those networks, and provide the detected user tariffs to the wireless mobile device for user selection of a tariff, detect whether a user policy or a mobile device policy stored at the wireless mobile device defines a subset of the available wireless mobile networks or tariffs, and provide only the subset of tariffs defined by the policy to the wireless mobile device, and provide the mobile identity to the wireless mobile device and to an authorization server of the selected available wireless mobile network, wherein: in response to receiving the user selection of the one of the available wireless mobile networks to obtain data access via the selected available wireless mobile network, the second circuitry provides the mobile identity to the wireless mobile device for storage by the first circuitry, provides the same mobile identity to the authorization server of the selected available wireless mobile network, and provides the identification and payment details relating to the user to the selected available wireless mobile network.

2. The system according to claim 1, wherein the first circuitry is configured to overwrite a current mobile identity with a mobile identity newly received from the account control server.

3. The system according to claim 1, wherein the first circuitry is configured to store a primary mobile identity for providing mobile data communication and a further mobile identity, the first circuitry being arranged to use the further mobile identity at least for communication with the account control server relating to changes to the primary mobile identity.

4. The system according to claim 1, wherein the mobile identity includes an International Mobile Subscriber Identifier (IMSI) number and an associated secret encryption key.

5. An account control server, comprising: a memory configured to store identification and payment details for a user of a wireless mobile device, the wireless mobile device including first circuitry configured to store a mobile identity, output for display to the user a set of available wireless mobile networks, receive from the user a selection of one of the available wireless mobile networks, and provide mobile data communication via the selected available wireless mobile network, subject to the mobile identity being registered with the selected available wireless mobile network; and second circuitry configured to: query one or more of the available wireless mobile networks to detect user tariffs associated with those networks, and provide the detected user tariffs to the wireless mobile device for user selection of a tariff, detect whether a user policy or a mobile device policy stored at the wireless mobile device defines a subset of the available wireless mobile networks or tariffs, and provide only the subset of tariffs defined by the policy to the wireless mobile device, and provide the mobile identity to the wireless mobile device and to an authorization server of the selected available wireless mobile network, wherein: in response to receiving the user selection of the one of the available wireless mobile networks to obtain data access via the selected available wireless mobile network, the second circuitry provides the mobile identity to the wireless mobile device for storage by the first circuitry, provides the same mobile identity to the authorization server of the selected available wireless mobile network, and provides the identification and payment details relating to the user to the selected available wireless mobile network.

6. The server according to claim 5, wherein the second circuitry is configured to provide the user's identification and payment details to other data communication providers.

7. A method of operation of a mobile data communications system comprising a wireless mobile device including first circuitry configured to store a mobile identity, output for display to a user a set of available wireless mobile networks, receive from the user a selection of one of the available wireless mobile networks, and provide mobile data communication via the selected available wireless mobile network, subject to the mobile identity being registered with the selected available wireless mobile network and an account control server, the account control server including a memory configured to store identification and payment details for the user of the wireless mobile device and second circuitry configured to provide the mobile identity to the wireless mobile device and to an authorization server of the selected available wireless mobile network, the method comprising: querying one or more of the available wireless mobile networks to detect user tariffs associated with those networks, and providing the detected user tariffs to the wireless mobile device for user selection of a tariff, detecting whether a user policy or a mobile device policy stored at the wireless mobile device defines a subset of the available wireless mobile networks or tariffs, and providing only the subset of tariffs defined by the policy to the wireless mobile device, and in response to receiving the user selection of the one of the available wireless mobile networks to obtain data access via the selected available wireless mobile network, providing, by the second circuitry, the mobile identity to the wireless mobile device for storage by the first circuitry, providing, by the second circuitry, the same mobile identity to the authorization server of the selected available wireless mobile network, and providing the identification and payment details relating to the user to the selected available wireless mobile network.

8. A method of operation of an account control server in a mobile data communications system comprising a wireless mobile device including first circuitry configured to store a mobile identity, output for display to a user a set of available wireless mobile networks, receive from the user a selection of one of the available wireless mobile networks, and provide mobile data communication via the selected available wireless mobile network, subject to the mobile identity being registered with the selected available wireless mobile network, the account control server including a memory configured to store identification and payment details for the user of the wireless mobile device and second circuitry configured to provide the mobile identity to the wireless mobile device and to an authorization server of the selected available wireless mobile network, the method comprising: querying one or more of the available wireless mobile networks to detect user tariffs associated with those networks, and providing the detected user tariffs to the wireless mobile device for user selection of a tariff; detecting whether a user policy or a mobile device policy stored at the wireless mobile device defines a subset of the available wireless mobile networks or tariffs, and providing only the subset of tariffs defined by the policy to the wireless mobile device; and in response to receiving the user selection of the one of the available wireless mobile networks to obtain data access via the selected available wireless mobile network, providing, by the second circuitry, the mobile identity to the wireless mobile device for storage by the first circuitry, providing, by the second circuitry, the same mobile identity to the authorization server of the selected available wireless mobile network, and providing the identification and payment details relating to the user to the selected available wireless mobile network.

9. A non-transitory machine-readable storage medium which stores computer software for implementing the method according to claim 8.

10. The system according to claim 1, wherein the wireless mobile device includes a subscriber identification module (SIM).

11. The system according to claim 1, wherein the first circuitry is further configured to: detect the set of available wireless mobile networks, provide the set of available wireless mobile networks to the account control server, receive tariff information associated with the set of available wireless mobile networks from the account control server, and output for display to the user the set of available wireless mobile networks and the tariff information.

12. A non-transitory computer readable medium having a computer program recorded thereon, the computer program configured to perform a method for controlling a mobile data communications system when executed on a computer, the mobile data communications system comprising a wireless mobile device including first circuitry configured to store a mobile identity, output for display to a user a set of available wireless mobile networks, receive from the user a selection of one of the available wireless mobile networks, and provide mobile data communication via the selected available wireless mobile network, subject to the mobile identity being registered with the selected available wireless mobile network and an account control server, the account control server including a memory configured to store identification and payment details for the user of the wireless mobile device and second circuitry configured to provide the mobile identity to the wireless mobile device and to an authorization server of the selected available wireless mobile network, the method comprising: querying one or more of the available wireless mobile networks to detect user tariffs associated with those networks, and providing the detected user tariffs to the wireless mobile device for user selection of a tariff, detecting whether a user policy or a mobile device policy stored at the wireless mobile device defines a subset of the available wireless mobile networks or tariffs, and providing only the subset of tariffs defined by the policy to the wireless mobile device, and in response to receiving the user selection of the one of the available wireless mobile networks to obtain data access via the selected available wireless mobile network, providing the mobile identity to the wireless mobile device for storage by the first circuitry, providing the same mobile identity to the authorization server of the selected available wireless mobile network, and providing the identification and payment details relating to the user to the selected available wireless mobile network.

* * * * *